UNITED STATES PATENT OFFICE.

JÜRGEN HINRICH MAGENS, OF HAMBURG, GERMANY.

METHOD OF PREPARING AND STORING CONCRETE.

No. 876,466.   Specification of Letters Patent.   Patented Jan. 14, 1908.

Application filed August 29, 1904. Serial No. 222,648.

*To all whom it may concern:*

Be it known that I, JÜRGEN HINRICH MAGENS, a subject of the German Emperor, and resident of Hamburg, in the German Empire, have invented certain new and useful Improvements Relating to the Treating of Concrete and the Like, of which the following is a specification.

This invention relates to the treatment of cement concrete, cement, concrete, cement mortar and the like whereby the setting of the material is retarded or arrested respectively so that the ready mixed material may be stored or transported to the work in progress, where it will be allowed to set.

The object of my invention is attained by cooling the material after mixture, and in some cases also before and during mixture, to a temperature below the air temperature prevailing for the time being.

The cooling may be conveniently effected by thoroughly sprinkling the gravel and broken stones &c. which are to be mixed with the cement, with cold water for a considerable time before mixing, and keeping the mixture, as the case may be, in a cold place until it is to be used, or by cooling it to a low temperature before using it. The simplest manner in which the material may be kept cold, is to utilize the cooling action of evaporating water, but any other appropriate method or means may be employed.

When the material is delivered to the works or building at which it is to be employed, its temperature is raised by heat from the air or by other suitable heat supply, and then at once used.

It is found in practice, contrary to the general opinion, that cooled or even frozen concrete after thawing or raising its temperature to the air temperature not only sets, but in time attains a degree of firmness which not only is equal to but excels that of concrete treated in the usual manner.

According to this invention considerable advantage results from the fact that by the method hereinbefore-described it is possible, to use concrete and the like, as a substitute for brickwork and masonry in those cases where the space required to mix the cement, gravel and broken stones and to prepare the concrete is not available, and where, moreover, there may not be a water supply.

Having fully described my invention what I claim and desire to secure by Letters Patent is:—

1. A method of preparing and storing mixed concrete-cement, concrete, cement-mortar and the like ready for use, which comprises cooling the constituent parts of the mixture, before they are mixed, below the temperature of the air prevailing at the time being, then mixing the same with water and maintaining the mixture in such cooled state and above freezing point until ready for use, whereby the mixture containing the requisite quantity of water for setting the cement may be transported without impairing its setting or binding properties.

2. A method of preparing and storing mixed concrete-cement, concrete, cement-mortar and the like ready for use, which comprises sprinkling the constituent parts of the mixture, sand, gravel, broken stone &c., with cold water, and exposing the so treated constituent parts to evaporate the water, and thereby cool them considerably below the normal temperature, then mixing the cooled constituents with cement and sufficent water to set the cement, and maintaining the mixture in such cooled state until used, whereby the mixture containing the requisite quantity of water for setting the cement may be transported without impairing its setting or binding properties.

JÜRGEN HINRICH MAGENS.

Witnesses:
MAX KAEMPFF,
J. CHRIST. HAFERMANN.